(12) United States Patent
Hamed et al.

(10) Patent No.: US 9,382,337 B2
(45) Date of Patent: Jul. 5, 2016

(54) HYDROGEL FORMING MATERIAL FROM BYPRODUCT PULP FINES

(71) Applicant: Rayonier Performance Fibers, LLC, Jacksonville, FL (US)

(72) Inventors: Othman A. Hamed, Jesup, GA (US); Romuald S. Krzywanski, Richmond Hill, GA (US)

(73) Assignee: Rayonier Performance Fibers, LLC, Jacksonville, FL (US)

( * ) Notice: Subject to any disclaimer, the term of this patent is extended or adjusted under 35 U.S.C. 154(b) by 0 days.

(21) Appl. No.: 14/565,029

(22) Filed: Dec. 9, 2014

(65) Prior Publication Data

US 2016/0159931 A1    Jun. 9, 2016

(51) Int. Cl.
  *C08B 11/12* (2006.01)
  *C08B 15/00* (2006.01)
  *C08B 17/06* (2006.01)
  *A61L 15/28* (2006.01)
  *C08B 11/08* (2006.01)
  *C08B 11/20* (2006.01)

(52) U.S. Cl.
  CPC .............. *C08B 11/08* (2013.01); *C08B 11/20* (2013.01)

(58) Field of Classification Search
  CPC ...... C08B 11/12; C08B 15/005; C08B 17/06; A61L 15/28; C98L 1/26
  USPC ................... 536/84, 88, 91, 95, 96
  See application file for complete search history.

(56) References Cited

U.S. PATENT DOCUMENTS

| | | | | |
|---|---|---|---|---|
| 4,248,595 A * | 2/1981 | Lask | ................ | A61L 15/28 536/84 |
| 4,523,010 A * | 6/1985 | Lukach | ................ | C08B 11/193 106/198.1 |
| 6,331,354 B1 * | 12/2001 | Sealey, II | ................ | D01D 5/098 428/357 |
| 2015/0040798 A1 * | 2/2015 | Kitamura | ................ | C08B 1/06 106/172.1 |

FOREIGN PATENT DOCUMENTS

JP        2004154165 A  *  6/2004

* cited by examiner

*Primary Examiner* — Patrick Lewis
*Assistant Examiner* — Everett White
(74) *Attorney, Agent, or Firm* — Lucas & Mercanti, LLP

(57) ABSTRACT

A process for making a hydrogel forming material from an unbleached cellulose pulp comprised of isolating pulp fines from the cellulose pulp by screening and/or dissolved air filtration, reacting the isolated pulp fines with alkaline hydroxide to form an alkali cellulose composition, preparing a heterogeneous mixture of the alkali cellulose composition and an etherifying agent, and optionally organic cross-linking agent, and reacting the components of the mixture to produce a hydrogel forming material. A polyvalent metal cross-linking agent can optionally be reacted with the hydrogel forming material to enhance its gel strength.

22 Claims, 2 Drawing Sheets

GDGE - Glycerol diglycidyl ether
ClCH₂COONa - Sodium Chloroacetate

HYDROGEL FORMING MATERIAL FROM BYPRODUCT PULP FINES

FIELD OF THE INVENTION

This invention relates to a method for making a hydrogel forming material from a byproduct of pulp manufacturing process, pulp fines, and the use of that hydrogel forming material.

BACKGROUND OF THE INVENTION

The process of manufacturing of dissolving pulps results in a byproduct stream comprised of unbleached pulp fines. The principal source of this byproduct is the sidehill screening of pulp. In some pulp processes sidehill screening is followed by a dissolved air flotation process (DAF). Dissolved air flotation process is a fractionation technique used in the pulp and paper industry to remove pulp fines and other particulates present in paper machine white water or other process waters. The process usually involves the use of micro-bubbles as a carrier phase. This process is also widely used in the treatment of industrial wastewaters for the removal or separation of, for example, macromolecules, chemicals, microorganisms, colloids, fibers, and fines. (A. Féris and J. Rubio (1999), Dissolved Air Flotation (DAF) Performance at Low Saturation Pressures, *Filtration & Separation*, vol. 36:9, November 1999, pages 61-65). In the DAF process an adjustable stream of the process water is saturated with air before entering the flotation chamber where the pressure is reduced to atmospheric pressure. Mixing of nonsaturated process water and air-saturated water can be done before or after entering the chamber. When the pressure of the air-saturated water is reduced billions of micro-bubbles in the range of 30-100 µm are formed. [A. L. Macfarlane, R. Prestidge, M. M. Farid and J. J. J. Chen (2007). These bubbles adhere to the suspended solids in the feed water stream. Suspended particles rise to the surface due to buoyancy forces, where they are skimmed off or float over a ridge in the chamber. The suspended particles usually comprise fines—cellulosic microfibers which typically have a length of no greater than about 200 µm, and other organic materials usually in association with inorganic particulate materials. The particles in such streams have, in some cases, proven difficult to dewater, in addition these waste streams are environmentally and economically undesirable to discharge.

The unbleached pulp fines utilized in the present invention, referred herein as simply pulp fines, are small particles that exist in all types of pulp. The main sources of pulp fines are 1) ray cells and axial parenchyma cells originating in wood; 2) fiber fragments from the wood chipping process; and 3) damaged fiber fragments from cooking and bleaching. The pulp fines of the invention can be isolated from paper machine white water or other pulp or paper industry processing streams using screening, such as sidehill screening, and/or DAF separation. As indicated above, the pulp fines utilized in the invention are unbleached cellulosic material, which differs from market wood pulp in that it has higher contents of lignin, hemicelluloses, metal, extractives, and non-cellulosic origin polymers.

The collected pulp fines are subsequently washed to remove organic materials and inorganic particulate materials. A large portion of the pulp fines is a cellulosic material that is a homopolysacharide with a sugar moiety that bears free hydroxyl groups available for chemical reaction. They are capable of undergoing the typical reactions known for primary and secondary alcohols. Polymers containing hydroxyl groups can be derivatized to produce materials with unlimited number of applications such as thickeners for foods, coatings, paints, explosive slurries, oil well fluids, cosmetics and other personal care products, and many other functional applications.

Derivatives of polyhydroxyl polymers are usually obtained by chemical reaction of the hydroxyl groups of the monosaccharide moiety with alkylene oxides (ethylene, propylene, butylene or higher oxides) or alkyl chlorides, in the presence of an alkaline catalyst (such as sodium hydroxide). The derivatization reaction may be conducted under heterogeneous conditions in the substantial absence of water or solvent although the efficiency of the reaction is low without the addition of water. Accordingly, the reaction is generally conducted in the presence of small amount of water to provide better reactivity. For instance, carboxymethylhydroxyalkyl derivatives of celluloses are obtained by chemical reaction of the hydroxyl groups of celluloses chain with a mixture of alkylene oxides (ethylene, propylene, butylene or higher oxides) and chloroacetic acid, in the presence of an alkaline catalyst.

There are numerous publications and patents on the preparation and utilization of cellulosic fibers (Gedon & Fengl, 1993; Heinze & Liebert, 2004; Majewicz & Padlas, 1993; Serad, 1993). However, to the best of our knowledge there are no known reports addressing the conversion of pulp fines into a hydrogel forming material in a single step process.

SUMMARY AND OBJECTS OF THE INVENTION

A need exists for a method of utilizing the pulp and paper industry byproduct pulp fines and converting it into a value added material with commercial applications. Therefore, the principal objective of the present invention is to provide a new hydrogel forming material and a method for converting pulp fines into a material that forms hydrogel in an aqueous solution. The hydrogel forming materials of the present invention could be used as thickeners in paints, lubricants in oil and gas well drilling, in mining and in construction.

The method of the invention comprises:
Isolating pulp fines from the cellulose pulp by screening and/or dissolved air filtration,
Converting the pulp fines into alkali cellulose by treating it with alkaline hydroxide,
Preparing a heterogeneous mixture comprising alkali cellulose, etherifying agent(s), and optionally an organic cross-linking agent,
Heating the mixture to produce a hydrogel forming material,
Optionally washing the produced hydrogel forming material and neutralizing it to a pH ranging from 3 to 12,
Optionally adding a polyvalent metal cross-linking agent to the hydrogel forming material to enhance its gel strength, and
Optionally drying the hydrogel forming material to a water content of 20% or less by weight.

By varying the amounts of the pulp fines, the amounts of the etherifying agent, the amounts of cross-linking agents, and/or the conditions under which the gelling material is formed, a wide range of aqueous hydrogels ranging from gels with low viscosity to gels with high viscosity exhibiting high gel strength can be produced.

DETAILED DESCRIPTION OF THE INVENTION

It is therefore an object of the present invention to convert the pulp and paper industry byproduct pulp fine into a hydrogel forming material capable of producing nearly clear solutions with high viscosity upon dispersing in water. A further object of the invention is to provide a process for producing the above described hydrogel forming material from pulp fines.

Figure 1:
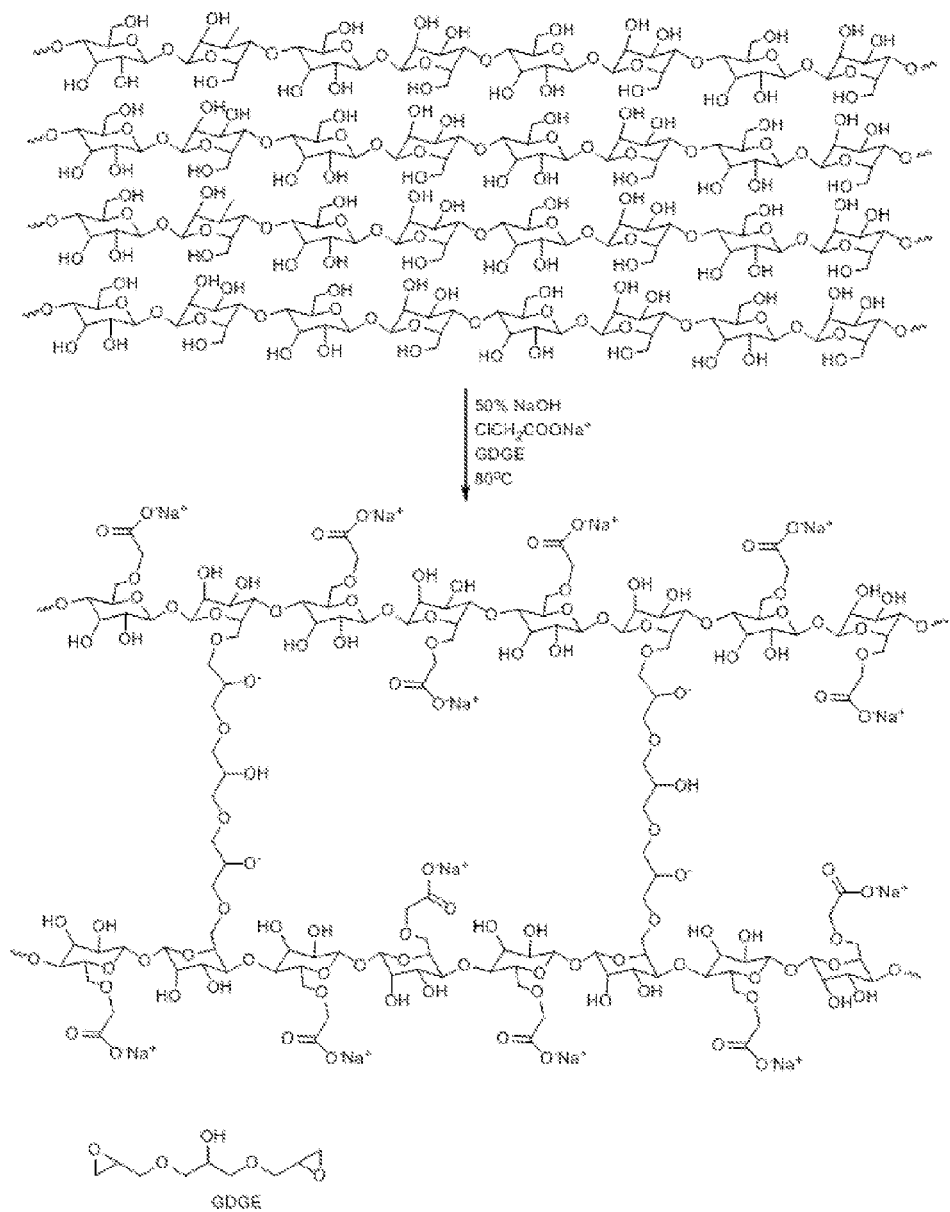
FIG. 1 is a representative reaction for producing a hydrogel forming material of the invention from cellulose.

Fines are small particles that exist in all types of pulp. The main sources of the pulp fines are 1) ray cells and axial parenchyma cells originating in wood; 2) fiber fragments from the wood chipping process; and 3) damaged fiber fragments from cooking and bleaching. The present invention relates to pulp fines that could have originated in all three steps. The pulp fines of the present invention are preferably collected using the sidehill screening process, and more preferably by sidehill screening followed by DAF fractionation. The pulp fines of the invention are preferably unbleached cellulosic material that differs from market wood pulp in that it has higher contents of lignin, hemicelluloses, metal, extractives, and non cellulosic origin polymers. Suitable cellulosic pulps for use in the invention can be derived from hard wood, soft wood and other cellulose containing plant matter, and can be pre-processed by either of the well-known kraft of sulphite processes. Hard wood pulps derived from a kraft process are preferred. The contained extractive may be metal ions, polyacrylamide, alum and starch. The chemical structure of fines is similar to that of cellulose. A representative reaction for producing a hydrogel forming material of the invention from cellulose is shown in FIG. 1.

The pulp fines of the invention preferably have a Kappa number (K-number) of about 2.0 to 18, more preferably not higher than 10, and most preferably not higher than 8.0, since it has been found that presence of lignin at high concentration can have an adverse effect of fines reactivity and the performance of the product made thereof. The referenced K-number values are determined in accordance with method of TAPPI T-236. The preferred pulp fines of the invention contain 50% to 90% by weight of cellulose polymer and about 2.0 to 8.0% by weight hemicellulose polymers both on a dry basis, with the balance of the pulp fines comprised of lignin and flocculants used in isolating the pulp fines. The polyacrylamide content of the preferred pulp fines, if present, is less than 1.0%, and more preferably less than 0.5% by weight. Polyacrylamide is used as flocculant in the DAF process, which concentrates sidehill fines. The sidehill DAF pulp fines may also contain starch and alum, as both materials are also used as flocculants in the DAF process. Preferably, each of the two materials is present in less than 1% by weight of the pulp fines of the present invention.

Pulp fines of the present invention preferably have a length of between 0.005 mm to 0.2 mm, and more preferably between 0.02 mm and 0.2 mm. Preferably the weight average molecular weight (Mw) of the cellulose component of the pulp fines of the invention is from 500 kDa to 900 kDa, and of the hemicellulose component from 2.0 kDa and 15 kDa. Preferably the number average molecular weight (Mn) of the cellulose component of the pulp fines is from 200 kDa to 500 kDa, and of the hemicellulose component from 1.0 kDa to 13 kDa. The weight average and number average molecular weight, and the molecular weight distribution of the cellulose and hemicelluloses components of pulp fines derived from hard wood and isolated by sidehill screening, followed by DAF separation, as determined by the HPLC/GPC method are summarized in Table I.

TABLE I

|  | Mn (kDa) | Mw (kDa) | Polydispersity (Mw/Mn) |
|---|---|---|---|
| Cellulose | 326.5 | 644.1 | 2.0 |
| Hemicelluloses | 7.2 | 9.8 | 1.36 |

Size Exclusion Chromatography (SEC) was performed on GPC/HPLC combination; the HPLC (1260 infinity from Agilent) consisted of HPLC solvent degasser, Quaternary pump, injector, and a UV detector. The GPC detector was an 18-angle light scattering detector the DAWN® HELEOS® II (Wyatt Technology) and the Refractive Index detector Optilab® T-REX (Wyatt Technology). The data acquisition was carried out in 0.5 second intervals with the ASTRA6 software (Wyatt Technologies Corp.). The mobile phase 0.5% LiCl/DMAc was filtered through 0.25 µm pore filters Millex LCR (Millipore) prior to use.

Figure 2:
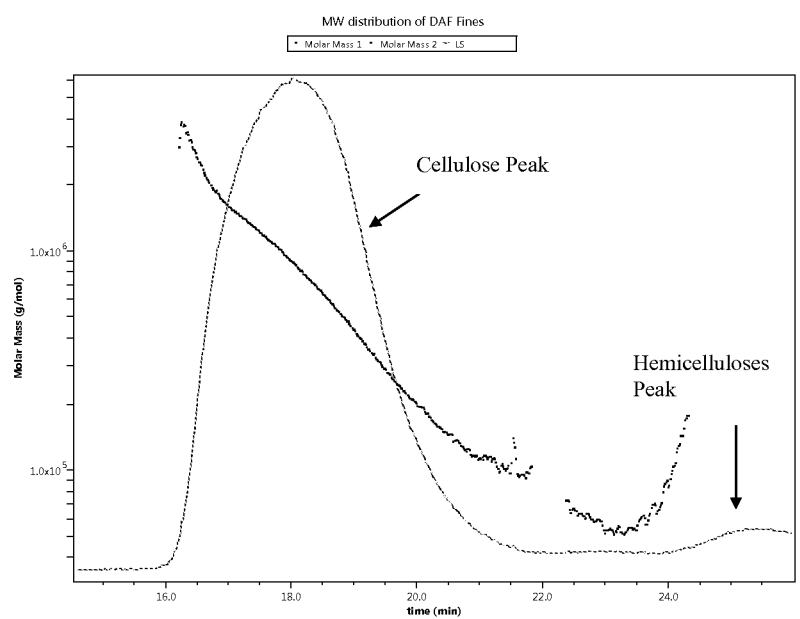
FIG. 2 is a graph depicting molar mass distribution versus elution time for sidehill DAF fines in 0.5% LiCl/DMAc.

The separation was carried out on a set of three columns that are connected on a series, the columns are 3×PLgel 10 µm MIXED-B, 300×7.5 mm (Agilent). They were placed in a heating compartmnent maintained at 25° C. and the system was operated at 25° C. with a flow rate of 1 ml/min. The mobile phase bottle was kept under a slight positive pressure of nitrogen gas. The injection volume was 100 µL and the run time was 40 minutes. Calibration was done by Wyatt technology with HPLC-grade toluene filtered with 0.02 µm filter Anotop 25. Normalization was carried out on-line (with the columns) with polystyrene 30,000 g/mol at 0.5016 g/mL in 0.5% LiCl/DMAc. The refractive index of 0.5% LiCl/DMAc was considered to be the same as that of DMAc (n=1.436). GPC analysis was performed on a sample of hardwood sidehill DAF fines. A solution of these fines with a concentration of 1.0 mg/mL was prepared in a solution of 0.5% LiCl/DMAc. The dn/dc value ($0.077$ mL g$^{-1}$) of cellulose solutions of 0.5% LiCl/DMAc used in the calculation of Mn and Mw was obtained from the literature [A.-L. Dupont, G. Mortha/*J. Chromatogr. A* 1026 (2004) 129-141]. Chromatograms of Mw distribution versus time shown in FIG. 2. The chromatogram shown in FIG. 2 shows two peaks. The red curve shows the elution of cellulose polymer with time and the black curve shows the elution of hemicelluloses with time. The black curve represents the molar mass distribution across elution time of cellulose chains present in the sidehill DAF fines.

Sugar analysis was performed on the fines using High pH Anion Exchange Chromatography with Pulsed Amperometric Detection (HPAEC/PAD) equipped with CarboPac PA1 or PA10 analytical column. Results showed that the sidehill DAF fines were composed of the polymers of glucose, xylose, mannose, arabinose and fucose monomers. Wherein, the glucose content was 68% by weight and xylose is 3.6% by weight on a dry basis. Preferably, the glucose content of the pulp fines range from 50% to 90% by weight and the xylose content range from 2% to 8% by weight.

Pulp fines contain moisture of about 45 to 55% by weight. It has been discovered that the amount of water present in the reaction mixture may adversely affect the efficiency of the derivatization reaction of the invention. Excess water reacts with derivatizing agents and converts them into alcohols and polyols. Accordingly, the pulp fines of the invention are preferably subjected to drying to reduce water contents to about 20% by weight, and more preferably to 10%. There is no need to incur expense drying the pulp fines below a water content of 10% by weight, since the presence of some water is important to keep their cellulosic structure accessible to the derivatizing agents and to prevent it from reaching the hornification stage.

Preferably the derivatization process of the present invention is carried out under heterogeneous conditions. In the process of the present invention, preferably pulp fines are first treated with an aqueous solution of alkali hydroxide. The aqueous solution of alkali hydroxide is preferably used in amount that affords about 0.5 to 8.0 times the molar concentration of hydroxide anion per mole of anhydroglucose repeat unit of cellulosic chain of pulp fines. Preferably the aqueous solution of alkali hydroxide used is in excess, providing hydroxide anions at about 1.5 to 6.0 times the molar concentration of the anhydroglucose repeat unit of cellulose chain of pulp fines. Alkaline hydroxides suitable for use in the present invention include sodium hydroxide (NaOH), lithium hydroxide (LiOH), potassium hydroxide (KOH), and rubidium hydroxide (RbOH); benzyltrimethylammonium hydroxide (BTMOH); and any combination of thereof. The alkaline catalyst can be added to the reaction mixture in solid form or in solution form, preferably in solution form. Sodium hydroxide is the preferred alkali catalyst of the present invention and a 50% sodium hydroxide solution is most preferred. The pulp fines of the invention are preferably dried to a moisture content of about 10% by weight when a 50% NaOH solution is used. The DAF fines may have a higher moisture content if more concentrated caustic solution is used.

According to the invention, pulp fines are preferably derivatized with reagents that are polar, preferably carry at least one functional group that undergoes ionization in aqueous alkaline solution, more preferably with reagents that can undergo substitution bimolecular reaction ($S_N2$), most preferably derivatizing agent undergoes an etherification reaction.

It is preferred in the present invention that the derivatizing agent is a monofunctional etherifying agent. Suitable derivatizing agents that are monofunctional etherifying agents include but are not limited to compounds that contain reactive halogen such as alkyl halides, such as chloromethane, halocarboxylic acid, halofatty acids, haloalkylsulphonic acids, haloalkylammonium compounds, and halohydins, and salts thereof. Examples of such reagents are halomethane, haloethane, α-haloacetic acid and its salt, chloropropanols, chloro-2-hydroxypropyltrimethylammoniumhydrochloride, and diethylaminoethylchloride. The monofunctional derivatizing agents can also be compounds containing a reactive unsaturated bond (e.g., ethylene sulphonic acid, acrylonitrile, and acrylamide), alkylsulphates, sultones, diazomethane, ethylene imine, methylolurea, and methylolmelamines.

The more preferred monofunctional derivatizing agents are those containing reactive epoxy group which include alkylene oxide, epoxychlorohdrin, and epoxy carboxylic acid. Examples of compounds with active epoxy groups are ethylene oxide, propylene oxide, epichlorohydrin, and mixtures thereof.

The amount of etherifying agent utilized in the invention will vary with the desired degree of substitution of the reaction product. The degree of substitution is preferably higher than 0.5, more preferably higher than 1.0 and most preferably higher than 1.5. In the preparation of the gelling material of the present invention, preferably the etherifying agent is used in an amount that affords about 0.5 to 4 times the moles of etherifying agent per mole of hydroxyl groups contained in the repeat unit of cellulose chain of pulp fines. Preferably the etherifying agent is used in an amount that affords about 1.0 to 3.0 times the moles of the hydroxyl groups contained in the repeat unit of cellulose chain of pulp fines, more preferably an excess of about 1.5 to 2 times moles of etherifying agent per mole of hydroxyl group is used.

One preferred embodiment of the process of the invention is:
  Isolating pulp fines from the cellulose pulp by screening and/or dissolved air filtration
  Converting the pulp fines into alkali cellulose by treating them with excess alkaline hydroxide,
  Preparing a heterogeneous mixture comprising the alkali cellulose, excess monofunctional derivatizing agent(s), and optionally an polyfunctional organic cross-linking agent,
  Heating the mixture under an inert atmosphere at a temperature ranging from 30° C. to 100° C. to produce a hydrogel forming material,
  Optionally washing the produced hydrogel forming material and neutralizing it to a pH between 3 and 12,
  Optionally adding a polyvalent metal cross-linking to a solution of the hydrogel forming material to enhance its gel strength, and
  Optionally drying the hydrogel forming material to a water content of 20% or less by weight.

The organic polyfunctional cross-linking agents useful in the invention are polyfunctional etherifying agents, including: polyepoxides, for example, polyglycidyl ethers, such as, for example, ethylene glycol diglycidyl ether, glycerol triglycidyl ether, glycerol diglycidyl ether, glycerol propoxylate triglycidyl ether, polyethylene glycol diglycidyl ether, propylene glycol glycidyl ether, 1,4-cyclohexanoldimethanol diglycidyl ether, diglycidyl 1,2-cyclohexanedicrboxylate, N,N-diglycidyl aniline, N,N-diglcidyl-4-glycidyloxyaniline, and diglycidyl 1,2,3,4-tetrahydrophthalate; and epoxy silanes such as, including glycidoxymethyltrimethoxysilane, glycidoxymethyl triethoxysilane, 2-glycidoxyethyl trimethoxysilane, 2-glycidoxyethyltriethoxysilane, 1-glycidoxyethyl trimethoxysilane, 1-glycidoxyethyl triethoxysilane, 3-glycidoxypropyltrimethoxysilane, 3-glycidoxypropyl triethoxysilane, 2-glycidoxypropyl trimethoxysilane, 2-glycidoxypropyltriethoxysilane, 1-glycidoxypropyl trimethoxysilane, 1-glycidoxypropyl triethoxysilane, 4-glycidoxybutyltrimethoxysilane, 4-glycidoxybutyl triethoxysilane, 3-glycidoxybutyl trimethoxysilane, 2-glycidoxybutyltrimethoxysilane, 2-glycidoxybutyl triethoxysilane, 1-glycidoxybutyl trimethoxysilane, 1-glycidoxybutyl triethoxysilane, (3,4-epoxycyclohexyl)methyltrimethoxysilane, (3,4-epoxycyclohexyl) methyl triethoxysilane, glycidoxymethylmethyl dimethoxysilane, glycidoxymethylmethyl diethoxysilane, 2-glycidoxyethylmethyl dimethoxysilan-e, 2-glycidoxyethylmethyl diethoxysilane, 1-glycidoxyethylmethyl dimethoxysilane, 1-glycidoxyethylmethyl diethoxysilane, 3-glycidoxypropylmethyl dimethoxysilane, 3-glycidoxypropylmethyl diethoxysilane, 2-glycidoxypropylmethyl dimethoxysilane, 2-glycidoxypropylmethyl diethoxysilane, 1-glycidoxypropylmethyl dimethoxysilane, 1-glycidoxypropylmethyl diethoxysilane, 4-glycidoxybutylmethyl dimethoxysilane, 4-glycidoxybutylmethyldiethoxysilane, 3-glycidoxybutylmethyl dimethoxysilane, 3-glycidoxybutylmethyl diethoxysilane, 2-glycidoxybutylmethyl dimethoxysilane, 2-glycidoxybutylmethyldiethoxysilane, 1-glycidoxybutylmethyl dimethoxysilane, 1-glycidoxybutylmethyl diethoxysilane, (3,4-epoxycyclohexyl)methylmethyl dimethoxysilane, and (3,4-epoxycyclohexyl)methylmethyldiethoxysilane.

Preferably the organic cross-linking agent is added to the reaction mixture in amounts within the range from about 0 to about 20% by weight of the monofunctional agent, preferably not more than about 10%, more preferably not more than about 5%, and most preferably not more than about 1%.

The desired degree of substitution can be achieved by knowing the amount of pulp fines and adding etherifying agent and organic cross-linking agent at mole ratios that afford the desirable degree of substitution. Using the guidelines provided herein, those skilled in the art will be capable of utilizing the appropriate amounts of agents, and contacting them for sufficient periods of time to achieve the desired properties.

Generally the derivatization of pulp fines according to the invention may be performed in various types of mixing equipment such as in containers provided with agitators or in rotating chambers. Preferably the reaction is performed in a pressure reactor and more preferably in a horizontal reactor equipped with an agitator in order to obtain the optimum mixing that leads to efficient reaction of pulp fines with reagents.

The etherification reaction preferably is carried out under an ambient atmospheric pressure of an inert gas such as nitrogen, argon, and helium. However, the reaction can also be conducted under pressure. Preferably, the pressure is less than 150 psig, more preferably less than 100 psig, even more preferably less than 80 psig, and most preferably less than 50 psig.

The initiation of the etherification reaction may be increased by a gradual warming up of the reaction mixture. The reaction temperature as well as the reaction period will depend, in part, on the etherifying agent, and those skilled in the art are capable of determining a suitable reaction temperature and time using the guidelines provided herein. For example, alkylene oxide requires lower heat and lower reaction time due to its high reactivity with alkoxide that is produced from reaction between cellulose and alkali hydroxide, whereby the reaction can be performed at a temperature slightly above the room temperature. In the case of propylene oxide or ethylene oxide, the reaction is performed in a pressure reactor.

The gelling material of the present invention can be prepared by various methods. In one method, an excess amount of the derivatizing agent is added gradually to a mixture of caustic and pulp fines. In another preferred embodiment etherifying agent is added at once. After agitation for about 3 minutes, preferably 5 minutes, and most preferably 10 minutes, the reaction mixture is heated to desired temperature for the desired time.

Preferably the derivatization reaction is carried out at a temperature within the range of from about 30° C. to about 80° C. As an additional example, when sodium chloroacetate and chloromethane are used, the reaction preferably is carried out at a temperature within the range from about 60° C. to about 80° C. The reaction preferably is carried for a period of time until the level of the residual etherifying agent is below 5% by weight of the total weight of the etherifying reactant feed. In the context of the present invention, the time required for the reaction to be completed, in general, can range from about 0.5 to about 12 hrs. More preferably the reaction is conducted at elevated temperatures for a time sufficient to complete the reaction relatively quickly, usually in about 3 hours to about 4 hours. The temperature range in which the reaction is generally conducted is from about 40° C. to about 100° C. While higher temperatures can be used, such as up to 110° C., there is generally no advantage achieved. The reaction is conducted under gentle mixing to keep a uniform mixture and temperature throughout the reactor.

After the reaction has been completed the product is removed from the reactor, washed free from salt, alkali, and other water-soluble ingredients using hot water or a mixture of hot water and alcohol, the alcohol preferably is methanol or ethanol. The product then can be neutralized with an acid to anywhere from slightly basic to slightly acidic. Any acid may be selected to neutralize the reaction mixture, including strong acids such as hydrochloric acid and sulfuric acid or weak acids such as acetic acid. In a preferred embodiment either sulfuric or acetic acid is used. The amount of acid used is the amount which is necessary to reach the desired pH. The neutralization preferably is performed using diluted solution of acid preferably at 10%, more preferably at 15%, and most preferably at 25% of acid by weight. Preferably the reaction mixture is neutralized to pH ranging from 3.0 to 12.0.

After washing and neutralization, the derivatized pulp fines preferably are then dried and recovered using means known in the art so that the final water content of the product is less than 20% by weight, more preferably less than 10% by weight, but preferably more than 5% by weight. Examples of drying process include air drying, filtering, evaporative drying, centrifuging, flash grinding, and addition of solvents, freeze drying and the like. Once dried, the solid compositions formed may be ground to yield particulates having a particle size as desired. The size of the particulates, preferably granular particles are primarily dictated by the desired final use. Similarly, the shape of the final compositions may be as desired. Alternatively, the product may be dried as a thin film, laminate, or sheet. Shapes including spherical particles, flakes and the like are clearly contemplated as falling within the scope of the invention. The key selection criteria for the final shape of the particulates is primarily dictated by the intended final use for the gel forming material.

The etherification reaction product, with optional organic cross-linking, could be left without drying and further cross-linked with a polyvalent metal to enhance gel strength and viscosity. After cross-linking of the hydrogel forming material of the present invention with a polyvalent metal, it is preferably dried as mentioned previously. Preferably, the cross-linking with polyvalent metal is performed at the time a hydrogel forming material of the invention is used. Wherein, the dried hydrogel forming material is suspended in water and the polyvalent metal cross-linking agent is applied.

The polyvalent metal cross-linking agents of the invention are capable of complexing with hydroxyl groups, alkoxy groups, carboxyl groups, and carboxylate groups. We have discovered that by varying the composition and/or amounts of such polyvalent metal cross-linking agents, and/or the conditions under which they are used in forming the gels, a wide range of aqueous gels ranging from solution with free mobile gels to rigid gels exhibiting high gel strength can be produced. Examples on polyvalent metal cross-linking agent of the invention include: titanium(IV) oxysulfate, titanium (IV) tetrachloride, titanium sulfate, tetrakis(isopropoxy)-titanium, Aluminum sulfate, zirconium oxychloride, zirconium orthosulfate, zirconium acetate, zirconium tetrachloride, zirconium ortho-sulfate, zirconium carbonate, zirconium ammonium carbonate, titanium dioxide, zirconium acetylacetonate, titanium citrate, titanium malate, titanium tartrate, zirconium lactate, and aluminum acetate, sodium borate, sodium tetraborate, disodium tetraborate, potassium borate, potassium tetraborate, and mixtures thereof. These cross-linking agents can be used in solid form or in solution form. Preferably they are used in a solution form having cross-linking agent concentration ranging from 0.1% by weight to 80% by weight, more preferably 5% to 70% by weight, and most preferably form 10% to 60% by weight. Suitable amount of cross-linking agent is the weight of cross-linking solution which provides a polyvalent metal complex from about 0.1% to about 10% by weight based on the total weight of the dry hydrogel forming material.

The viscosity of hydrogel produced from dissolving the hydrogel forming material of the present invention in water depends on several factors among these: 1) the concentration of the gelling material, 2) the amount of cross-liking agent used, 3) pH of the aqueous gel, and 4) type and amount of derivatizing agent. The effect of these factors can be seen clearly in the following Examples. Preferably the gelling material of the present invention has a derivatizing density of not less than 40%, and more preferably not less than 30%, and most preferably not less than 20%. The derivatizing density is defined as shown in the following equation:

Derivatizing Density=(No. of derivatizing group attached to sugar repeat unit times molar mass of derivatizing group)/molar mass of derivatized sugar repeat unit.

Molar mass of derivatized repeat unit=162 (molar mass of anhydroglucose repeat unit)+no. of derivatizing group times molar mass of derivatizing group.

Preferably the viscosity of the gelling material of the present invention is at 2.5% concentration, 20 rpm, and 20° C. not less than 500 cp.

EXAMPLES

Example 1

Reaction of Alkali Pulp Fines with Propylene Oxide and Chloromethane

A sample of sidehill hard wood pulp fines (100.0 g oven dried weight, 0.61 mol, 1.85 mol hydroxyl groups) was loaded in a horizontal pressure reactor. The reactor was evacuated and refilled five times with nitrogen then 160.0 g of 50% aqueous NaOH was added over a period of 30 min, the mixture was agitated for about 10 min, then propylene oxide (20.0 g) was added followed with (60.0 g) of chloromethane. The mixture was agitated at room temperature for 10 minutes. Then the temperature was raised to 80° C. in about 200 minutes, and maintained at 80° C. for 60 minutes. Afterwards the reactor was cooled down to room temperature. Product was collected, washed with hot water (90° C.) to neutral, dried in an oven at 80° C. to a moisture contents of less than 10% by weight of the product, and ground through a 30 mesh screen using Wiley mill.

The viscosity as a function of concentration of the product of Example 1 is shown in Table II. The viscosity was measured with Brookfield viscometer (spindle 6, 20 rpm, 22° C.).

TABLE II

Viscosity as a function of concentration of the hydrogel forming material of Example 1 (spindle No. 6, rotation 20).

| | Concentration (% by weight) | | |
|---|---|---|---|
| | 1.0 | 2.5 | 5.0 |
| Viscosity (cp) | 750 | 22350 | Over the range |

Example 2

Reaction of Alkali Pulp Fines with Chloromethane

Example 1 was repeated without propylene oxide. In this Example a sample of alkali pulp fines was reacted with chloromethane. The viscosity of gels made with the product so produced are reported in Table III.

TABLE III

Viscosity as a function of concentration of the gelling material of Example 2 (spindle No. 6, rotation 20).

| | Concentration (% by weight) | | |
|---|---|---|---|
| | 1.0 | 2.5 | 5.0 |
| Viscosity (cp) | 200 | 3400 | 3400 |

Example 3

Reaction of Alkali Pulp Fines with Sodium Chloroacetate

A sample of the pulp fines utilized in Example 1 (100.0 g, 0.61 mol, 1.85 mol hydroxyl groups) was loaded into a horizontal pressure reactor. The reactor was evacuated and refilled five times with nitrogen then 160.0 g of 50% aqueous NaOH was added over a period of 30 minutes. The mixture was agitated for about 10 minutes and then sodium chloroacetate (107.3 g, 0.93 mol, 0.5 eq./hydroxyl group) was added followed with the addition of (1.0 g, 0.5% of total reactant, dissolved in 50 mL isopropyl alcohol). The mixture was agitated for 10 minutes at room temperature. Then the temperature was raised to 80° C. in about 200 minutes, and maintained at 80° C. for 60 minutes. Afterwards the reactor was cooled down to room temperature. The product was collected, washed with solution of methanol (3 times) 40% by weight in water at room temperature, dried in an oven at 80° C. to a moisture contents of less than 10% by weight of the product, and ground through a 30 mesh screen using Wiley mill.

The viscosity as a function of concentration, pH of the gelling material of Example 3 is shown in Tables IV and V. The viscosity was measured with Brookfield viscometer (spindle 6, 20 rpm, 22° C.).

TABLE IV

Viscosity as a function of concentration of the hydrogel forming material of Example 3 (spindle No. 6, rotation 20).

| | Concentration (% by weight) | | |
|---|---|---|---|
| | 1.0 | 2.5 | 5.0* |
| Viscosity (cp) | 650 | 2350 | 53200 |

*spindle number 5 was used in this Example)

TABLE V

Effect of pH on viscosity of a solution prepared from gelling material of Example 3 (solution concentration 2.5% by weight, spindle No. 6, rotation 20)

| | pH | | | | |
|---|---|---|---|---|---|
| | 11.2 | 6.5 | 5.5 | 4.0 | 3.5 |
| Viscosity (cp) | 2350 | 2330 | 2300 | 2150 | 150 phase separation |

Example 4

Cross-Linking of Hydrogel Forming Material of Example 3 with Polyvalent Metal

Solutions of the gelling material of Example 3 prepared in water at 1.0 and 2.5% by weight were cross-linked with an aqueous solution of titanium orthosulfate (30% by weight). Viscosity as a function of amount of cross-linking agent and pH are shown in Tables VI, VII, and VIII. Viscosities were measured with Brookfield viscometer (spindle 6, 20 rpm, 20° C.).

TABLE VI

Viscosity of a 2.5% by weight solution made from gelling material of Example 3 as a function of cross-linking agent titanium orthosulfate, gel pH = 11.2.

| | Amount of cross-linking agent solution added (g)/30 g solution | | | | | |
|---|---|---|---|---|---|---|
| | 0.0 | 0.1 | 0.2 | 0.3 | 0.4 | 0.5 |
| Viscosity (cp) | 2350 | 3050 | 3850 | 6200 | 21500 | 32300 |

TABLE VII

Viscosity of a 2.5% by weight solution made from gelling material of Example 3 as a function of cross-linking agent titanium orthosulfate, gel pH = 6.0.

| | Amount of cross-linking agent solution added (g)/30 g solution | | | | | |
|---|---|---|---|---|---|---|
| | 0.0 | 0.1 | 0.2 | 0.3 | 0.4 | 0.5 |
| Viscosity (cp) | 2310 | 3100 | 3350 | 3500 | 6300 | 25050 |

TABLE VIII

Viscosity of a 1.0% by weight solution made from gelling material of Example 3 as a function of cross-linking agent titanium orthosulfate, gel pH = 11.2.

| | Amount of cross-linking agent solution added (g)/30 g solution | | | | | |
|---|---|---|---|---|---|---|
| | 0.0 | 0.1 | 0.2 | 0.3 | 0.4 | 0.5 |
| Viscosity (cp) | 2310 | 3100 | 3350 | 3500 | 6300 | 25050 |

Example 5

Reaction of Alkali Pulp Fines with Sodium Chloroacetate in Presence of Solvent Isopropyl Alcohol A sample of never dried sidehill pulp fines (100.0 g, oven dried weight) was charged into a 2 L Pyrex reaction kettle. The reaction kettle was fitted with a thermocouple inserted though a rubber septum, a Teflon bladed agitator on a glass shaft attached to a mechanical mixer, a gas inlet polyethylene tubing inserted through an adapter fitted with a rubber septum, and a gas outlet adapter connected to a gas trap partially filled with oil placed. To the flask was added isopropyl alcohol (200.0 mL), followed by the addition of 50% solution of sodium hydroxide (160.0 g). The reaction was left to stir for 15 minutes at room temperature, and then a solution of sodium chloroacetate (28.0 g) in water (50 mL) was added in one portion. After the addition was completed the reaction temperature was raised to 80° C. The reaction was stirred for 2 hours and then filtered. The resulting slurry was collected by filtration, washed sequentially with 2 L 40/60 methanol/water solutions, dried in an oven at 80° C. to a moisture contents of less than 10% by weight of the product, and ground through a 30 mesh screen using Wiley mill.

TABLE IX

Viscosity as a function of concentration of the gelling material of Example 5 (spindle No. 6, rotation 20).

| | Concentration (% by weight) | | |
|---|---|---|---|
| | 1.0 | 2.5 | 5.0 |
| Viscosity (cp) | 350 | 1800 | 3950 |

What is claimed is:

1. A process for making a hydrogel forming material from an unbleached cellulose pulp byproduct of the pulp and paper industry comprised of pulp fines, hemicellulose compounds and lignin comprising:
   isolating pulp fines from the cellulose pulp by screening and/or dissolved air filtration, wherein said isolated pulp fines comprise hemicellulose compounds, lignin flocculant, and cellulose fibers having fiber length in the range of 0.005 mm to 0.2 mm, a Kappa number in the range of 2.0 to 20.0, and said hemicellulose compounds have a concentration between 2.0% and 10% on a dry weight basis;
   reacting the isolated pulp fines with alkaline hydroxide to form an alkali cellulose composition;
   preparing a heterogeneous mixture comprising the alkali cellulose composition and at least one etherifying agent; and
   reacting the etherifying agent and the alkali cellulose composition at a temperature in the range of 30° C. to 100° C. for about 0.5 hours to about 12 hours to produce a hydrogel forming material.

2. The process of claim 1, wherein on a dry basis the pulp fines comprise 50 to 90% by weight cellulose polymer and 2 to 8% by weight hemicellulose polymers.

3. The process of claim 2, wherein the hemicellulose polymers in the pulp fines comprise monomers of glucose, xylose, mannose, arabinose, and fucose.

4. The process of claim 3, wherein the glucose monomer comprises 50% to 90% by weight of the hemicellulose polymers in the pulp fines.

5. The process of claim 2, wherein the pulp fines comprise cellulose fibers having a length in the range of 0.02 mm to 0.2 mm.

6. The process of claim 2, wherein the cellulose fiber component of the pulp fines has a weight average molecular (Mw) weight from 500 kDa to 900 kDa and the hemicellulose polymers have a weight average molecular weight (Mw) from 2.0 kDa to 15 kDa.

7. The process of claim 2, wherein the pulp fines comprise not more than 1% by weight polyacrylamide and not more than 1% by weight of each starch and alum.

8. The process of claim 1, wherein the isolated pulp fines have a Kappa number not exceeding 18.

9. The process of claim 1, further comprising the step of washing the hydrogel forming material and neutralizing it to a pH from 3 to 12.

10. The process of claim 9, further comprising the step of drying the washed and neutralized hydrogel forming material to a water concentration of not more than 20% by weight.

11. The process of claim 1, wherein an organic cross-linking agent is added to the heterogeneous mixture of the alkali cellulose composition and etherifying agent, and is reacted with the alkali cellulose.

12. The process of claim 11, wherein the organic cross-linking agent comprises ethylene glycol diglycidyl ether, glycerol triglycidyl ether, glycerol diglycidyl ether, glycerol propoxylate triglycidyl ether, polyethylen glycol diglycidyl ether, propylene glycol glycidyl ether or 1,4-cyclohexanoldimethanol diglycidyl ether.

13. The process of claim 11, wherein the organic cross-linking agent comprises ethylene glycol diglycidyl ether, glycerol triglycidyl ether, or glycerol diglycidyl ether.

14. The process of claim 13, wherein the weight ratio of organic cross-linking agent to etherifying agent is from 0.1:10 to 1:10.

15. The process of claim 1, further comprising the step of cross-linking the hydrogel forming material with a polyvalent metal cross-linking agent.

16. The process of claim 15, wherein the polyvalent metal cross-linking agent comprises titanium(IV) oxysulfate, titanium (IV) tetrachloride, titanium sulfate, tetrakis(isopropoxy)-titanium, aluminum sulfate, zirconium oxychloride, zirconium orthosulfate, zirconium acetate, zirconium tetrachloride, zirconium ortho-sulfate, zirconium carbonate, zirconium ammonium carbonate, titanium dioxide, zirconium acetylacetonate, titanium citrate, titanium malate, titanium tartrate, zirconium lactate, aluminum acetate, sodium borate, sodium tetraborate, disodium tetraborate, potassium borate or potassium tetraborate.

17. The process of claim 16, wherein the polyvalent metal cross-linking agent comprises less than 10% by weight of the hydrogel forming material on a dry basis.

18. The process of claim 1, wherein the etherifying agent comprises an alkyl halide, halocarboxylic acid, halofatty acid, haloalkylsulphonic acid, haloalkylammonium compound, halohydin, chloroacetic acid, epoxychlorohdrin, epoxy carboxylic acid, a salt of one of the foregoing, chloromethane or alkylene oxide.

19. The process of claim 18, wherein the alkaline hydroxide comprises sodium hydroxide (NaOH), lithium hydroxide (LiOH), potassium hydroxide (KOH), and rubidium hydroxide (RbOH), or benzyltrimethylammonium hydroxide (BTMOH).

20. The process of claim 1, wherein the pulp fines have cellulosic chains containing anhydroglucose repeat units and the alkaline hydroxide is present in the reaction in an amount that affords from 4.5 to 6.0 moles of hydroxide anion per mole of anhydroglucose repeat unit of cellulosic chains of the pulp fines.

21. The process of claim 1, wherein the hydrogel forming material produced has a viscosity of at least 1000 cp, at 20° C., 20 rpm when in an aqueous solution at a concentration of 2.5% by weight.

22. The process of claim 21, wherein the hydrogel forming material has Derivatizing Density of not less than 20% by weight.

* * * * *